(12) United States Patent
Tani et al.

(10) Patent No.: US 11,878,431 B2
(45) Date of Patent: Jan. 23, 2024

(54) END EFFECTOR AND MEMBER MOUNTING METHOD

(71) Applicant: Shimizu Corporation, Tokyo (JP)

(72) Inventors: Taku Tani, Tokyo (JP); Syunsuke Igarashi, Tokyo (JP)

(73) Assignee: SHIMIZU CORPORATION, Tokyo (JP)

( * ) Notice: Subject to any disclaimer, the term of this patent is extended or adjusted under 35 U.S.C. 154(b) by 685 days.

(21) Appl. No.: 15/733,892

(22) PCT Filed: May 20, 2019

(86) PCT No.: PCT/JP2019/019978
§ 371 (c)(1),
(2) Date: Dec. 1, 2020

(87) PCT Pub. No.: WO2019/235204
PCT Pub. Date: Dec. 12, 2019

(65) Prior Publication Data
US 2021/0213613 A1    Jul. 15, 2021

(30) Foreign Application Priority Data

Jun. 4, 2018 (JP) ................................ 2018-107145

(51) Int. Cl.
*B25J 9/16*    (2006.01)
*B25J 11/00*   (2006.01)
(Continued)

(52) U.S. Cl.
CPC ............. *B25J 9/1687* (2013.01); *B23P 19/06* (2013.01); *B25J 9/1697* (2013.01); *B25J 11/005* (2013.01);
(Continued)

(58) Field of Classification Search
CPC ...... B25J 9/1687; B25J 9/1697; B25J 11/005; B25J 15/0004; B25J 15/0033; B25J 15/0038; B23P 19/06; E04G 21/16
See application file for complete search history.

(56) References Cited

U.S. PATENT DOCUMENTS 3,168,128 A * 2/1965 Steadle, Jr. ............. B23P 19/06
                                                      408/127
4,058,884 A * 11/1977 Lydon .................... B25B 21/00
                                                       81/451
2014/0125080 A1    5/2014  Dan et al.

FOREIGN PATENT DOCUMENTS

JP    5-57541 A    3/1993
JP    6-344232 A   12/1994
(Continued)

OTHER PUBLICATIONS

English translation of Japanese patent JP 2017-110466 (Year: 2017).*
(Continued)

*Primary Examiner* — Dean J Kramer
(74) *Attorney, Agent, or Firm* — XSENSUS LLP

(57) ABSTRACT

An end effector comprising: a driving roller and presser rollers configured to hold a threaded member; a motor; a linear guide and an air cylinder including a rod configured to move the threaded member linearly along the axis of the threaded member; a detector; a robot arm; and a controller configured to: provide the threaded member near a position coaxially facing a threaded hole member by controlling the robot arm based on the position and the direction of the threaded hole member detected by the detector; and insert and screw the threaded member into the threaded hole member by controlling: the air cylinder including the rod to advance the threaded member toward the threaded hole member and insert a tip of the threaded member into the (Continued)

threaded hole member; and the motor to rotate the threaded member about the axis of the threaded member.

4 Claims, 5 Drawing Sheets

(51) Int. Cl.
    *B25J 15/00*     (2006.01)
    *B23P 19/06*     (2006.01)
    *B25J 15/02*     (2006.01)

(52) U.S. Cl.
    CPC ....... *B25J 15/0004* (2013.01); *B25J 15/0038* (2013.01); *B25J 15/0253* (2013.01)

(56) References Cited

FOREIGN PATENT DOCUMENTS

| | | | |
|---|---|---|---|
| JP | 7-24562 | U | 5/1995 |
| JP | 2008-55527 | A | 3/2008 |
| JP | 2017-110466 | A | 6/2017 |
| WO | 2013/005330 | A1 | 1/2013 |
| WO | 2017/104027 | A1 | 6/2017 |
| WO | 2019/235204 | A1 | 12/2019 |

OTHER PUBLICATIONS

Japanese Notice of Reasons for Refusal dated Mar. 4, 2022 in Japanese Application No. 2018-107145.
International Search Report and Written Opinion dated Jun. 25, 2019, received for PCT Application No. PCT/JP2019/019978, Filed on May 20, 2019, 11 pages including English Translation.

\* cited by examiner (1)

(2)

END EFFECTOR AND MEMBER MOUNTING METHOD

CROSS-REFERENCE TO RELATED APPLICATIONS

The present application is based on PCT filing PCT/JP2019/019978, filed May 20, 2019, which claims priority to JP 2018-107145, filed Jun. 4, 2018, the entire contents of each are incorporated herein by reference.

FIELD

The present invention relates to an end effector and a member mounting method suitable for mounting a hanging bolt during a ceiling construction, for example.

BACKGROUND

During conventional constructions of a ceiling of a building, construction works such as mounting of ceiling hanging bolts or ceiling boards are performed. Such construction works are done manually by workers facing upwards, with the use of an elevated work platform vehicles or scaffolding. Generally, ceiling hanging bolts need to be mounted in a large quantity, so the workers need to repeat the process of moving the scaffolding or the like, and fastening a bolt many times at high places.

To alleviate such burdens of workers, the applicant of this patent application has disclosed a construction robot in Patent Literature 1. This construction robot is designed to insert a hanging bolt (male screw) into an insert (female screw), and to fix the ceiling-hanging member.

CITATION LIST

Patent Literature

Patent Literature 1: Japanese Patent Application Laid-open No. 2017-110466

SUMMARY

Technical Problem

In order to improve the work efficiency of the construction robot disclosed in Patent Literature 1, there has been a need for reducing the time required in the operation of guiding the tip of a hanging bolt to a position where an insert is mounted, and inserting the hanging bolt held thereby into the insert.

An object of the present invention is to provide an end effector and a member mounting method for performing an operation of holding a threaded member, and inserting the threaded member into a threaded hole member, efficiently.

Solution to Problem

To solve the problem and achieve the object, an end effector according to the present invention configured to hold a threaded member and insert the threaded member into a threaded hole member, includes: a holding means configured to hold the threaded member in a manner rotatable about an axis of the threaded member; a rotating means configured to rotate the threaded member about the axis of the threaded member; a linear moving means configured to move the threaded member linearly along the axis of the threaded member; a detecting means configured to detect a position and a direction of the threaded hole member; a changing means configured to change a position and a direction of the threaded member with respect to the threaded hole member; and a controlling means configured to control the foregoing means, wherein the controlling means is configured to: provide the threaded member near a position coaxially facing the threaded hole member by controlling the changing means based on the position and the direction of the threaded hole member detected by the detecting means; and insert and screw the threaded member into the threaded hole member by controlling: the linear moving means to advance the threaded member toward the threaded hole member and insert a tip of the threaded member into the threaded hole member; and the rotating means to rotate the threaded member about the axis of the threaded member.

Moreover, in the end effector according to the present invention, the holding means includes: a driving roller that is connected to a rotational shaft of the rotating means; and at least two presser rollers configured to rotate about respective rotational shafts, the respective rotational shafts extending in parallel with a rotational shaft of the driving roller.

Moreover, a construction robot according to the present invention includes the end effector according to the present invention.

Moreover, a method of mounting a threaded member into a threaded hole member using the end effector according to the present invention, includes: a step of holding the threaded member with the holding means; a step of detecting a position and a direction of the threaded hole member with the detecting means; a step of providing the held threaded member near a position coaxially facing the threaded hole member with the changing means, based on the position and the direction of the threaded hole member detected by the detecting means; a step of advancing the threaded member that has moved to the position facing the threaded hole member toward the threaded hole member and inserting a tip of the threaded member into the threaded hole member with the linear moving means; and a step of inserting and screwing the threaded member into the threaded hole member by rotating the threaded member about the axis of the threaded member with the rotating means.

Advantageous Effects of Invention

With the end effector according to the present invention that is an end effector for holding a threaded member and inserting the threaded member into a threaded hole member, because the end effector includes: the holding means that holds the threaded member in a manner rotatable about the axis of the threaded member; the rotating means that rotates the threaded member about the axis; the linear moving means that moves the threaded member linearly along the axis; the detecting means that detects a position and a direction of the threaded hole member; the changing means that changes a position and a direction of the threaded member with respect to the threaded hole member; and the controlling means that controls the foregoing means, the controlling means controlling the changing means based on the position and the direction of the threaded hole member detected by the detecting means so as to bring the threaded member near a position coaxially facing the threaded hole member, controlling the linear moving means to advance the threaded member toward the threaded hole member and to insert the tip of the threaded member into the threaded hole member, and controlling the rotating means to rotate the threaded member about the axis so as to insert and screw the threaded member into the threaded hole member, it is possible to reduce the time required in holding and inserting the threaded member into the threaded hole member.

Therefore, mounting can be performed efficiently, advantageously.

Furthermore, with another end effector according to the present invention, because the holding means includes the driving roller that is connected to the rotational shaft of the rotating means, and the at least two presser rollers that rotate about their respective rotational shafts extending in parallel with the rotational shaft of the driving roller, it is possible to achieve the functions for holding and rotating the threaded member using a simple structure, advantageously.

Furthermore, with the construction robot according to the present invention, because the end effector described above is provided, it is possible to improve the efficiency of the mounting performed by the construction robot, advantageously.

Furthermore, with the member mounting method according to the present invention that is a method for mounting a threaded member in a threaded hole member using the end effector described above, because the method includes: the step of holding the threaded member with the holding means; the step of detecting a position and a direction of the threaded hole member with the detecting means; the step of bringing the held threaded member near a position coaxially facing the threaded hole member with the changing means, based on the position and the direction of the threaded hole member detected by the detecting means; the step of advancing the threaded member that has moved to the position facing the threaded hole member toward the threaded hole member, and inserting the tip of the threaded member into the threaded hole member using the linear moving means; and the step of inserting and screwing the threaded member into the threaded hole member by rotating the threaded member about the axis using the rotating means, it is possible to reduce the time required in holding and inserting the threaded member into the threaded hole member. Therefore, mounting can be performed efficiently, advantageously.

DESCRIPTION OF EMBODIMENTS

An end effector and a member mounting method according to one embodiment of the present invention will now be explained in detail with reference to some drawings. The embodiment is, however, not intended to limit the scope of the present invention in any way.

Figure 1:
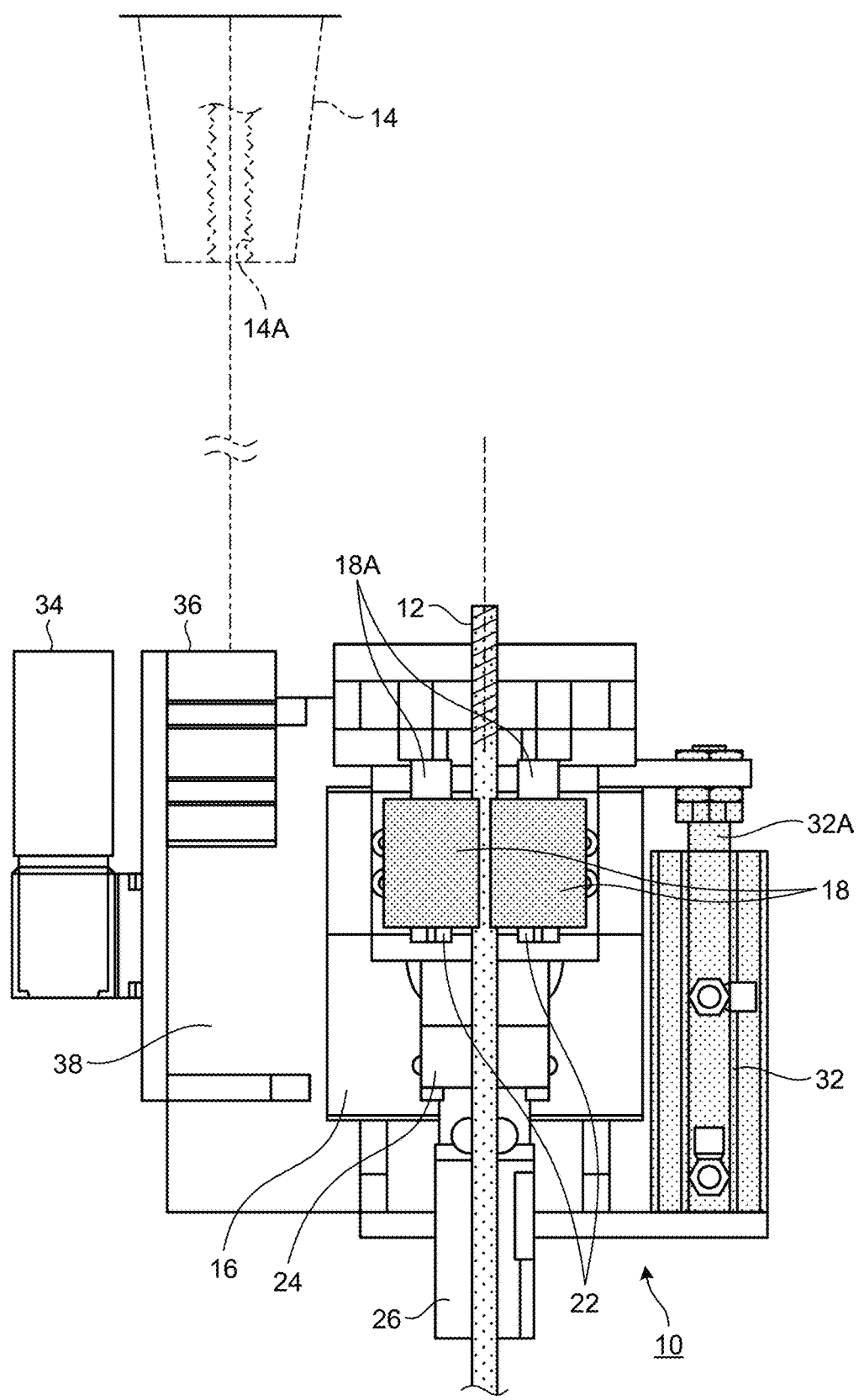
FIG. 1 is a front view illustrating an end effector according to an embodiment of the present invention.

As illustrated in FIG. 1, an end effector 10 according to the embodiment is used in holding and inserting a hanging bolt 12 (threaded member) into an insert 14 (threaded hole member). This end effector 10 is attached removably to the tip of the manipulator (robot arm) provided to a construction robot such as that described above.

Figure 2:
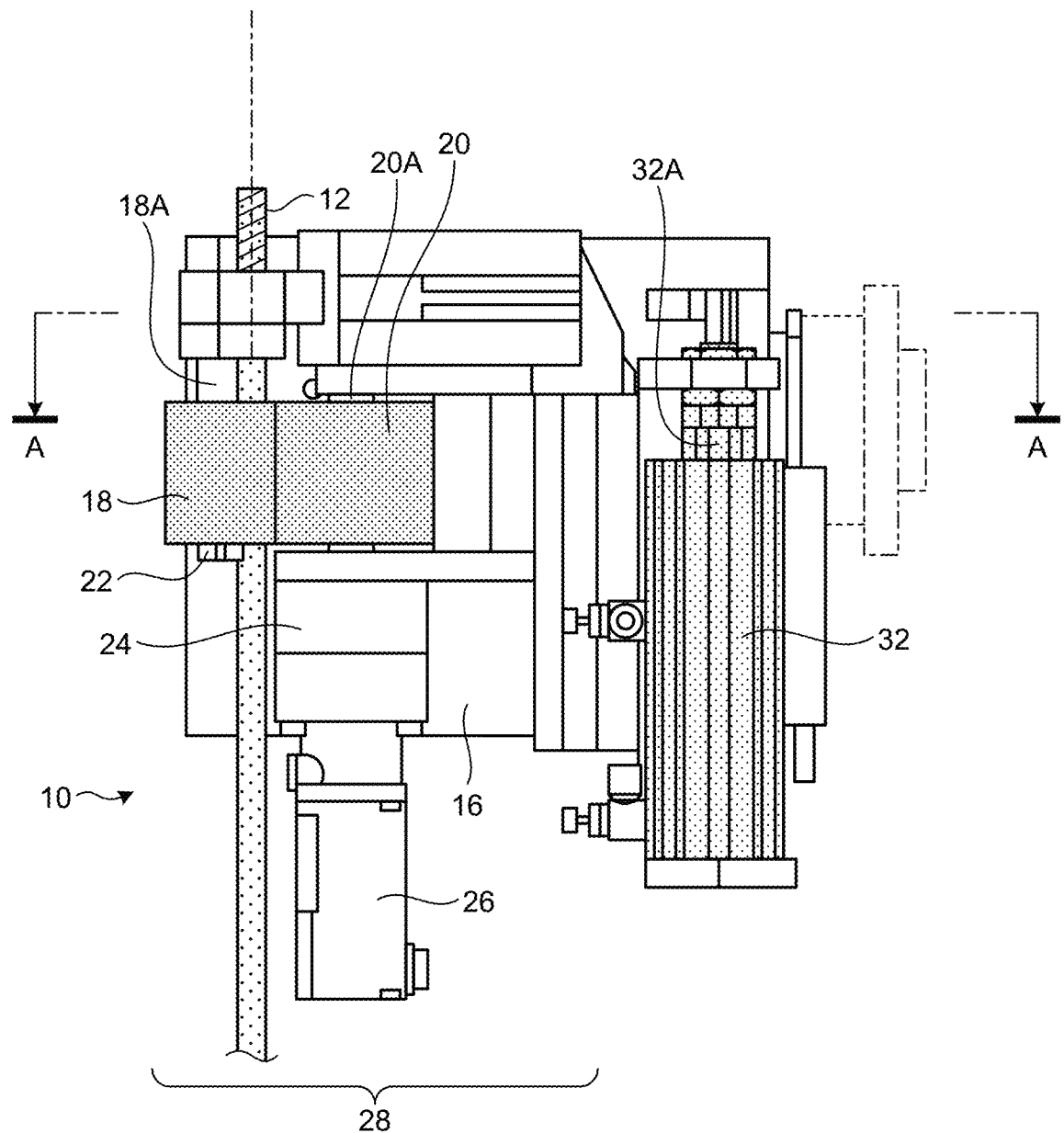
FIG. 2 is a side view illustrating the end effector according to the embodiment of the present invention.
Figure 3:
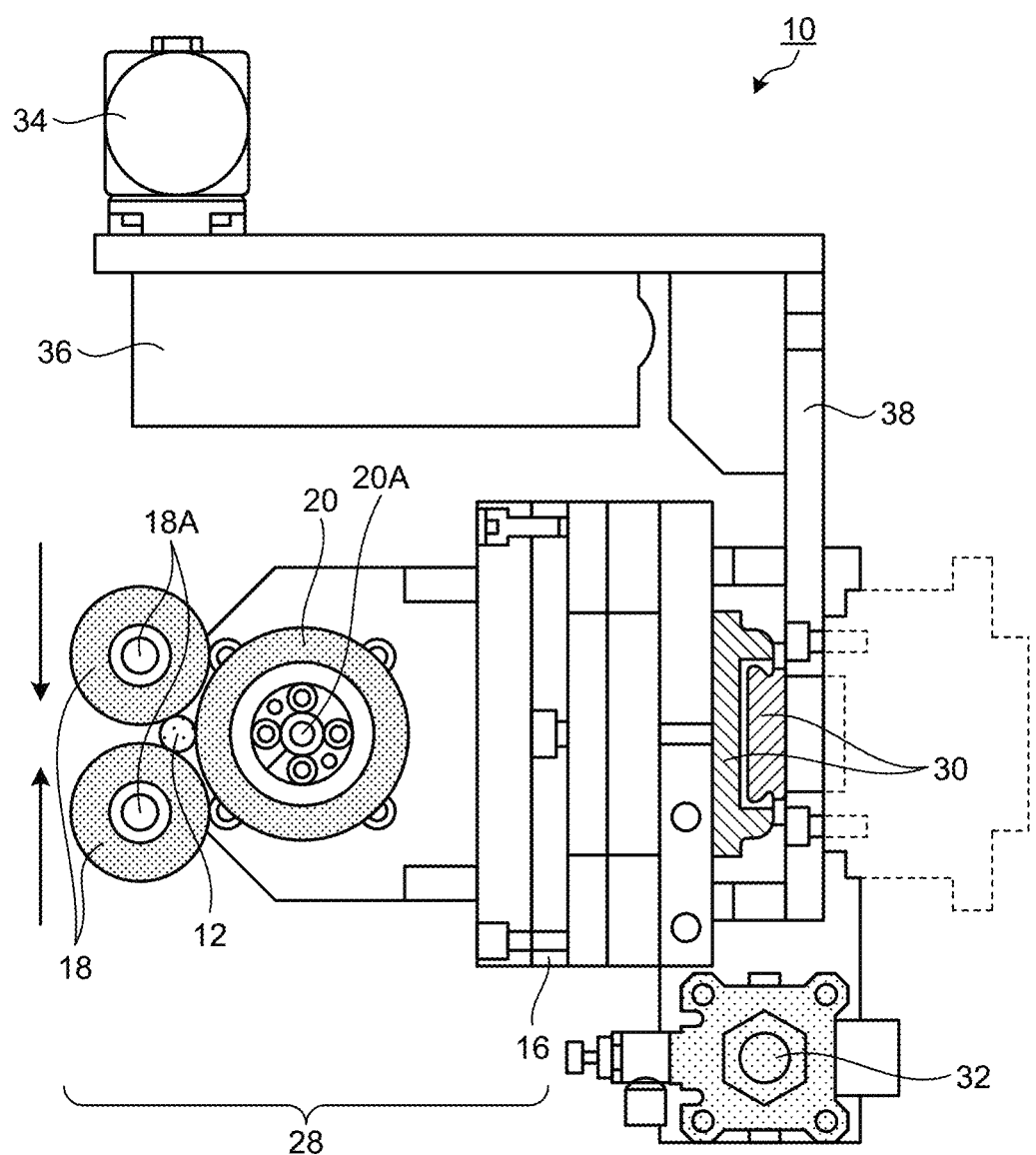
FIG. 3 is a top view along the line A-A in FIG. 2.

As illustrated in FIGS. 1 to 3, the end effector 10 includes a main body 16, two presser rollers 18 provided on one side of the main body 16, and a driving roller 20 (holding means). Supporting shafts 18A, 20A (rotational shafts) of the respective presser rollers 18 and driving roller 20 are disposed in parallel with respect to one another, and, in a view in their axial direction, as illustrated in FIG. 3, the shaft centers thereof are positioned at the vertices of an isosceles triangle.

Figure 4:
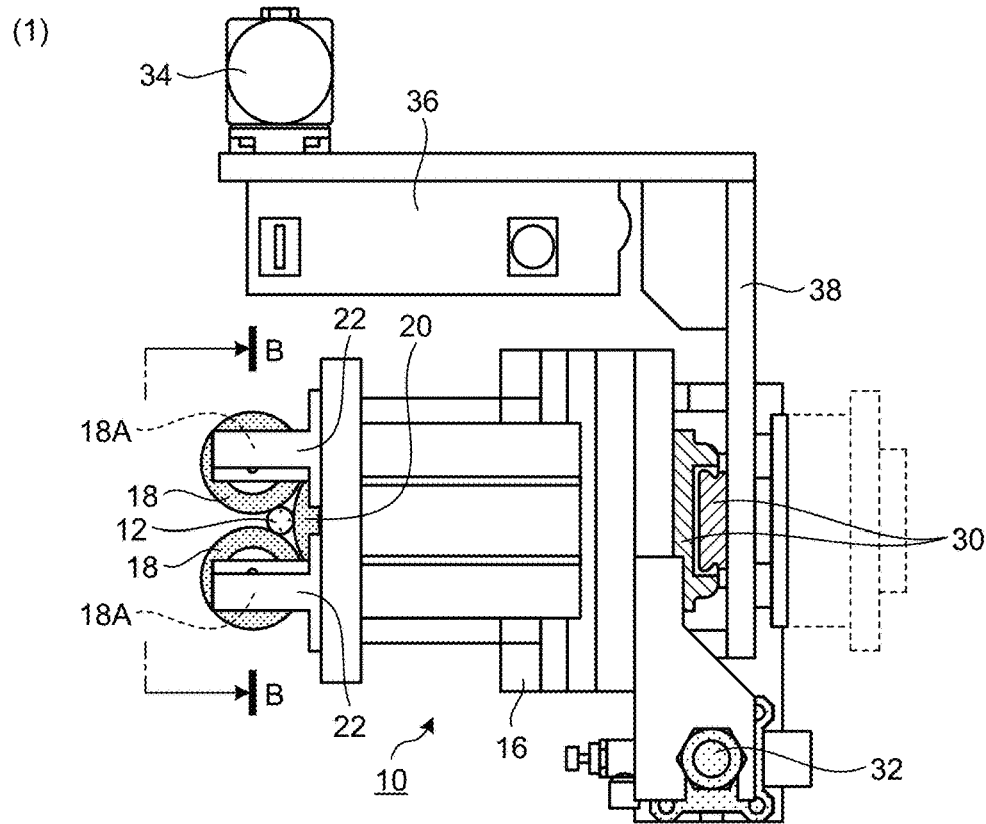
FIG. 4 is a bottom view illustrating the end effector according to the embodiment of the present invention, in which (1) is a schematic with a holding means closed, and (2) is a schematic with the holding means opened.
Figure 4:
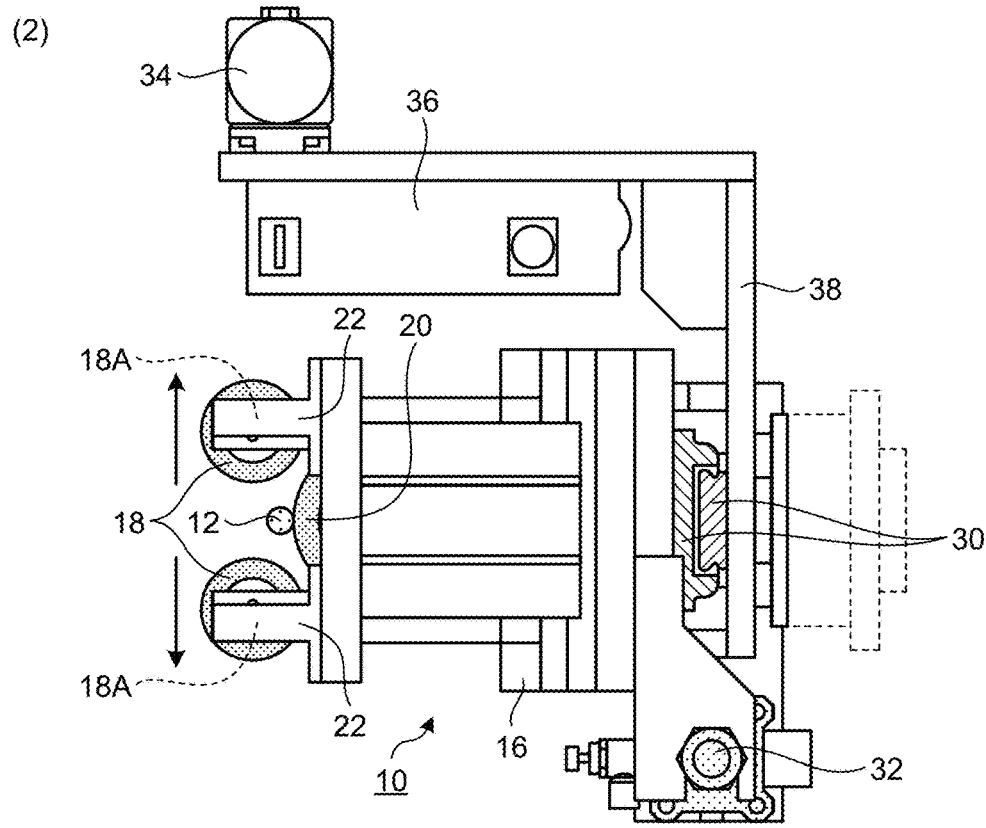
Figure 5:
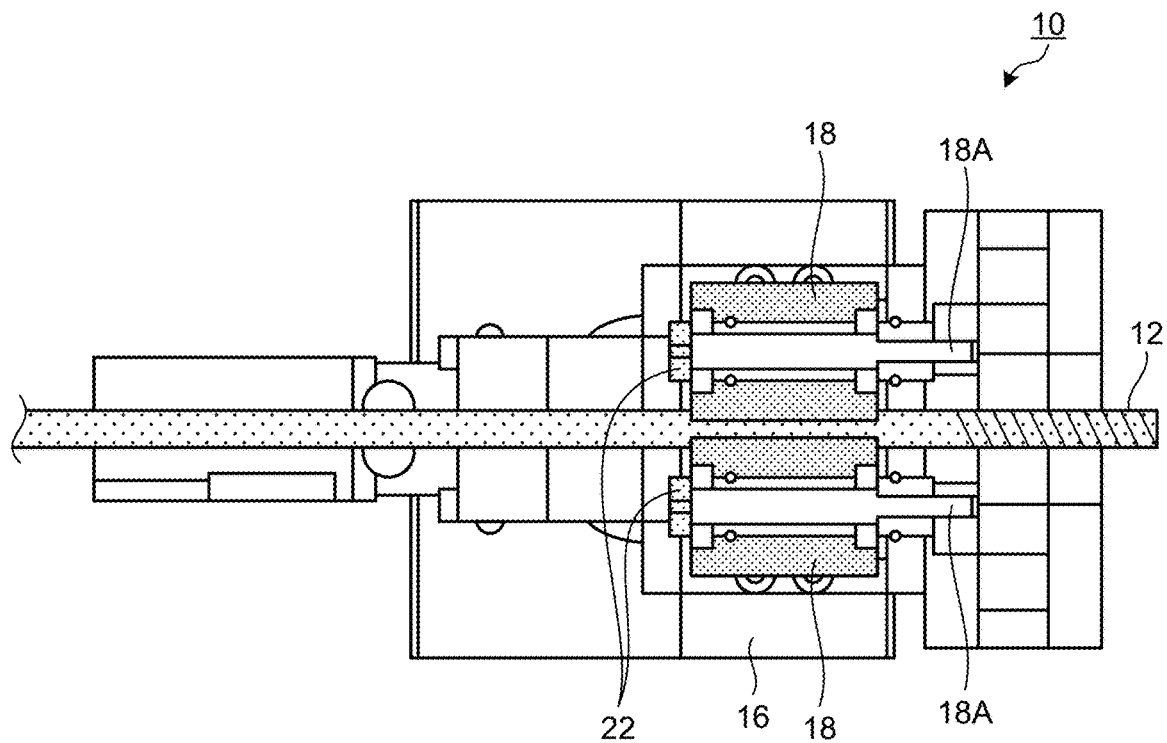
FIG. 5 is a cross-sectional view along the line B-B in FIG. 4(1).

As illustrated in FIGS. 4 and 5, the supporting shafts 18A of the presser rollers 18 are fixed to a parallel chuck 22, in a manner rotatable about their respective shaft centers. The parallel chuck 22 is fixed to the main body 16 in a manner movable in an axially vertical direction (up-and-down direction in FIG. 4). The presser rollers 18 are movable in directions approaching each other, and separating from each other, via opening and closing operations of the parallel chuck 22. As illustrated in FIG. 4(1), when the parallel chuck 22 is closed, with a hanging bolt 12 placed between the presser rollers 18 and the driving roller 20, the two presser rollers 18 move closer to each other. As a result, the hanging bolt 12 is nipped and held by the two presser rollers 18 and the driving roller 20, at three points along its outer circumferential surface. Conversely, when the parallel chuck 22 is opened, as illustrated in FIG. 4(2), the two presser rollers 18 separate from each other. As a result, the force for holding the hanging bolt 12 is released.

As illustrated in FIGS. 2 and 3, the driving roller 20 is used for holding the hanging bolt 12, together with the presser rollers 18, and giving a rotating force to the hanging bolt 12. As illustrated in FIG. 2, the supporting shaft 20A of the driving roller 20 is connected to the output shaft of a servo motor 26 (rotating means) via a decelerator 24. When the servo motor 26 is rotated, the driving roller 20 is caused to rotate via the decelerator 24, and the hanging bolt 12, which is held thereby, is also caused to rotate. The presser rollers 18, the driving roller 20, the decelerator 24, and the servo motor 26 together form a holding/fastening mechanism 28 involved in holding and fastening the hanging bolt 12. With this simple structure, it is possible to achieve the functions for holding and rotating the hanging bolt 12.

On the other side of the main body 16, as illustrated in FIGS. 2 and 3, a linear guide 30 and an air cylinder 32 (linear moving means) are provided. The linear guide 30 and a rod 32A included in the air cylinder 32 extend in parallel with the supporting shaft 20A of the driving roller 20. When the rod 32A in the air cylinder 32 is extended, one side of the main body 16 including the holding/fastening mechanism 28 is caused to move along the linear guide 30. In this manner, it becomes possible to slide the holding/fastening mechanism 28 that includes the presser rollers 18, the driving roller 20, the decelerator 24, and the servo motor 26, in a direction in which the hanging bolt 12 is to be inserted.

On the one side of the main body 16, a camera sensor 34 and a two-dimensional sensor 36 (detecting means) are provided via an arm 38. With the camera sensor 34 and the two-dimensional sensor 36, it is possible to detect the position (position) and the inclination (direction) of the opening of a threaded hole 14A on the insert 14.

As described above, this end effector 10 is removably attached to the tip of a manipulator of a construction robot. This manipulator functions as a changing means according to the present invention, for changing the position and the inclination (direction) of the end effector 10.

The operations of the holding/fastening mechanism 28, the air cylinder 32, the camera sensor 34, the two-dimensional sensor 36, and the manipulator described above are controlled by a controlling means, not illustrated.

An operation of and effects achieved by the structure described above will now be explained.

To begin with, the end effector 10 is moved to a position for holding the hanging bolt 12. The hanging bolt 12 is then positioned between the presser rollers 18 and the driving roller 20, and an operation for closing the parallel chuck 22 is then performed. In this manner, the hanging bolt 12 is held between the presser rollers 18 and the driving roller 20, as illustrated in FIG. 1.

The manipulator, not illustrated, is then operated to bring the end effector 10 to a position near and below the insert 14, and to adjust the orientation of the end effector 10 in such a manner that the camera sensor 34 and the two-dimensional sensor 36 face upwards. The position and the inclination of the threaded hole 14A of the insert 14 are then detected with the camera sensor 34 and the two-dimensional sensor 36. The controlling means then operates the manipulator based on the detection results, and adjusts the orientation of the end effector 10 in such a manner that the shaft of the hanging bolt 12 held thereby comes near a position coaxially facing the threaded hole 14A of the insert 14. If the insert 14 is inclined, the controlling means also inclines the hanging bolt 12.

Figure 6:
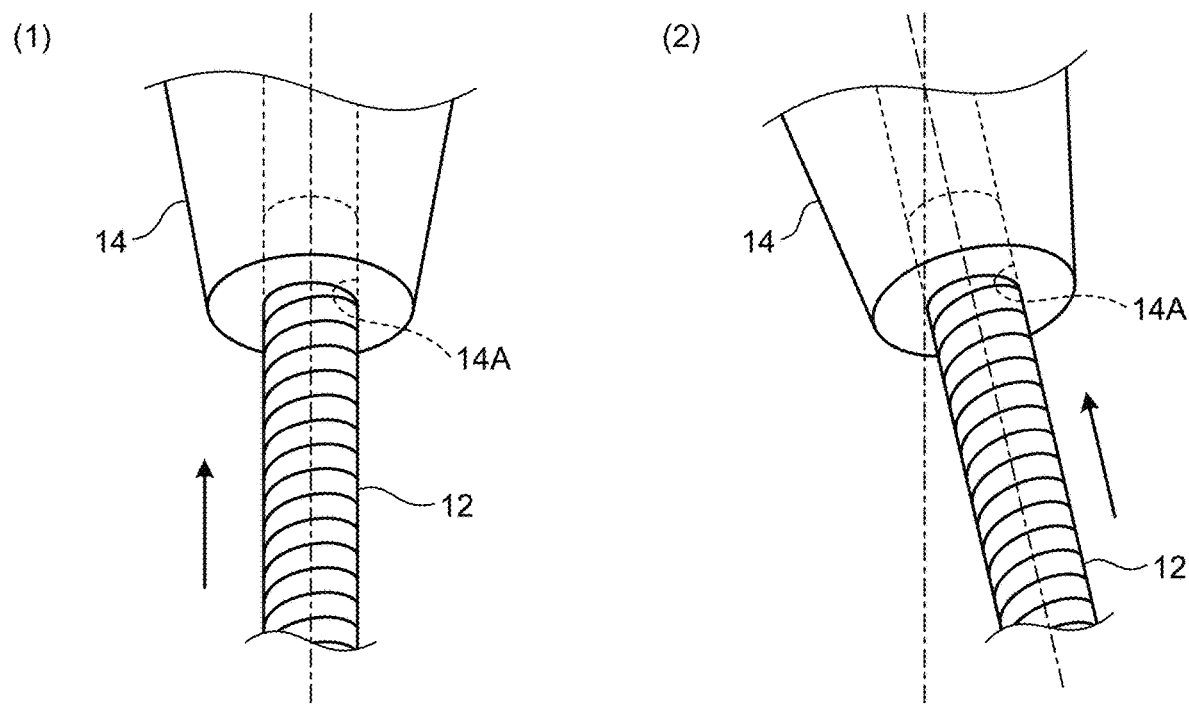
FIG. 6 is a schematic illustrating how a hanging bolt is inserted.

For example, when the axis of the threaded hole 14A of the insert 14 is vertically oriented, the hanging bolt 12 is brought to a position coaxially below the insert 14, and the rod 32A of the air cylinder 32 is extended. As a result, the holding/fastening mechanism 28 as well as the hanging bolt 12 move up toward the insert 14 along the linear guide 30, and the tip of the hanging bolt 12 goes into the threaded hole 14A, as illustrated in FIG. 6(1). By then driving the servo motor 26 while extending the rod 32A of the air cylinder 32, the hanging bolt 12 is rotated with the driving roller 20. By allowing the male screw portion of the hanging bolt 12 to become engaged with the female screw portion of the insert 14, the hanging bolt 12 is fixed to the insert 14.

When the threaded hole 14A of the insert 14 is inclined with respect to the vertical direction, the hanging bolt 12 is brought to a position below the insert 14, and then inclined in such a manner that the hanging bolt 12 is positioned coaxially with the insert 14, and the rod 32A of the air cylinder 32 is then extended. By this extension, the holding/fastening mechanism 28 as well as the hanging bolt 12 are moved up along the linear guide 30 toward the insert 14, and the tip of the hanging bolt 12 goes into the threaded hole 14A, as illustrated in FIG. 6(2). By driving the servo motor 26 while extending the rod 32A of the air cylinder 32, the hanging bolt 12 is caused to rotate with the driving roller 20. By screwing the male screw portion of the hanging bolt 12 into the female screw portion of the insert 14, the hanging bolt 12 is fixed to the insert 14.

After the hanging bolt 12 is mounted, the presser rollers 18 are opened, and the end effector 10 is returned to the base position (home position) by operating the manipulator (robot arm) not illustrated, and an operation for mounting another hanging bolt 12 is then performed. This operation is repeated until mounting of all of the hanging bolts 12 are completed.

In the manner described above, with the method using the end effector 10 according to the embodiment, it is possible to reduce the time required for the operation of holding the hanging bolt 12 and mounting the hanging bolt 12 in the insert 14. Therefore, mounting can be performed efficiently. In this manner, the power and the labor required in the construction works can be reduced.

As described above, with the end effector according to the present invention that is an end effector for holding a threaded member and inserting a threaded member into a threaded hole member, because the end effector includes: the holding means that holds the threaded member in a manner rotatable about the axis of the threaded member; the rotating means that rotates the threaded member about the axis; the linear moving means that moves the threaded member linearly along the axis; the detecting means that detects a position and a direction of the threaded hole member; the changing means that changes a position and a direction of the threaded member with respect to the threaded hole member; and the controlling means that controls the foregoing means, the controlling means controlling the changing means based on the position and the direction of the threaded hole member detected by the detecting means so as to bring the threaded member near a position coaxially facing the threaded hole member, controlling the linear moving means to advance the threaded member toward the threaded hole member and to insert the tip of the threaded member into the threaded hole member, and controlling the rotating means to rotate the threaded member about the axis so as to insert and screw the threaded member into the threaded hole member, it is possible to reduce the time required in holding and inserting the threaded member into the threaded hole member. Therefore, mounting can be performed efficiently.

Furthermore, with another end effector according to the present invention, because the holding means includes the driving roller that is connected to a rotational shaft of the rotating means, and the at least two presser rollers that rotate about respective rotational shafts extending in parallel with the rotational shaft of the driving roller, it is possible to achieve the functions for holding and rotating the threaded member using a simple structure.

Furthermore, with the construction robot according to the present invention, because the end effector described above is provided, it is possible to improve the efficiency of the mounting performed by the construction robot.

Furthermore, with the member mounting method according to the present invention that is a method for mounting a threaded member in a threaded hole member using the end effector described above, because the method includes: the step of holding the threaded member with the holding means; the step of detecting a position and a direction of the threaded hole member with the detecting means; the step of bringing the held threaded member near a position coaxially facing the threaded hole member with the changing means, based on the position and the direction of the threaded hole member detected by the detecting means; the step of advancing the threaded member that has moved to the position facing the threaded hole member toward the threaded hole member, and inserting the tip of the threaded member into the threaded hole member using the linear moving means; and the step of inserting and screwing the threaded member into the threaded hole member by rotating the threaded member about the axis using the rotating means, it is possible to reduce the time required in holding and inserting the threaded member into the threaded hole member. Therefore, mounting can be performed efficiently.

INDUSTRIAL APPLICABILITY

As described above, the end effector and the member mounting method according to the present invention is useful in mounting a hanging bolt in an insert, during a construction work of a ceiling of a building, and is particularly suitable for mounting a member in a shorter time period.

REFERENCE SIGNS LIST 10 end effector
12 hanging bolt (threaded member)
14 insert (threaded hole member)
14A threaded hole
16 main body
18 presser roller (holding means)
20 driving roller (holding means, rotating means)
18A, 20A supporting shaft (rotational shaft)
22 parallel chuck
24 decelerator
26 servo motor (rotating means)
28 holding/fastening mechanism
30 linear guide (linear moving means)
32 air cylinder (linear moving means)
32A rod
34 camera sensor (detecting means)
36 two-dimensional sensor (detecting means)
38 arm

The invention claimed is:

1. An end effector comprising:
a driving roller and presser rollers, the driving roller and the presser rollers being configured to hold a threaded member in a manner rotatable about an axis of the threaded member;
a motor configured to rotate the threaded member about the axis of the threaded member;
a linear guide and an air cylinder including a rod, the linear guide and the air cylinder including the rod being configured to move the threaded member linearly along the axis of the threaded member;
a detector configured to detect a position and a direction of a threaded hole member;
a robot arm configured to change a position and a direction of the threaded member with respect to the threaded hole member; and
a controller configured to:
provide the threaded member near a position coaxially facing the threaded hole member by controlling the robot arm based on the position and the direction of the threaded hole member detected by the detector; and
insert and screw the threaded member into the threaded hole member by controlling:
the air cylinder including the rod to advance the threaded member toward the threaded hole member and insert a tip of the threaded member into the threaded hole member; and
the motor to rotate the threaded member about the axis of the threaded member.

2. The end effector according to claim 1, wherein
the driving roller is connected to a rotational shaft of the motor, and
the presser rollers include at least two presser rollers configured to rotate about respective rotational shafts, the respective rotational shafts extending in parallel with a rotational shaft of the driving roller.

3. A construction robot comprising an end effector including:
a driving roller and presser rollers, the driving roller and the presser rollers being configured to hold a threaded member in a manner rotatable about an axis of the threaded member;
a motor configured to rotate the threaded member about the axis of the threaded member;
a linear guide and an air cylinder including a rod, the linear guide and the air cylinder including the rod being configured to move the threaded member linearly along the axis of the threaded member;
a detector configured to detect a position and a direction of a threaded hole member;
a robot arm configured to change a position and a direction of the threaded member with respect to the threaded hole member; and
a controller configured to:
provide the threaded member near a position coaxially facing the threaded hole member by controlling the robot arm based on the position and the direction of the threaded hole member detected by the detector; and
insert and screw the threaded member into the threaded hole member by controlling:
the air cylinder including the rod to advance the threaded member toward the threaded hole member and insert a tip of the threaded member into the threaded hole member; and
the motor to rotate the threaded member about the axis of the threaded member.

4. A method of mounting a threaded member into a threaded hole member using an end effector including:
a driving roller and presser rollers, the driving roller and the presser rollers being configured to hold a threaded member in a manner rotatable about an axis of the threaded member;
a motor configured to rotate the threaded member about the axis of the threaded member;
a linear guide and an air cylinder including a rod, the linear guide and the air cylinder including the rod being configured to move the threaded member linearly along the axis of the threaded member;
a detector configured to detect a position and a direction of a threaded hole member;
a robot arm configured to change a position and a direction of the threaded member with respect to the threaded hole member; and
a controller configured to:
provide the threaded member near a position coaxially facing the threaded hole member by controlling the robot arm based on the position and the direction of the threaded hole member detected by the detector; and
insert and screw the threaded member into the threaded hole member by controlling:
the air cylinder including the rod to advance the threaded member toward the threaded hole member and insert a tip of the threaded member into the threaded hole member; and
the motor to rotate the threaded member about the axis of the threaded member, the method comprising:
holding the threaded member with the driving roller and presser rollers;
detecting a position and a direction of the threaded hole member with the detector;
providing the held threaded member near a position coaxially facing the threaded hole member with the robot arm, based on the position and the direction of the threaded hole member detected by the detector;

advancing the threaded member that has moved to the position facing the threaded hole member toward the threaded hole member and inserting a tip of the threaded member into the threaded hole member with the air cylinder including the rod; and inserting and screwing the threaded member into the threaded hole member by rotating the threaded member about the axis of the threaded member with the motor.

\* \* \* \* \*